US011469029B2

(12) United States Patent
Arai et al.

(10) Patent No.: US 11,469,029 B2
(45) Date of Patent: Oct. 11, 2022

(54) MULTILAYER COIL COMPONENT AND ELECTRONIC DEVICE

(71) Applicant: TAIYO YUDEN CO., LTD., Tokyo (JP)

(72) Inventors: Takayuki Arai, Takasaki (JP); Tomoo Kashiwa, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 545 days.

(21) Appl. No.: 16/584,702

(22) Filed: Sep. 26, 2019

(65) Prior Publication Data

US 2020/0105450 A1 Apr. 2, 2020

(30) Foreign Application Priority Data

Sep. 28, 2018 (JP) ............................ JP2018-185573

(51) Int. Cl.
*B23P 19/00* (2006.01)
*H01F 17/00* (2006.01)
(Continued)

(52) U.S. Cl.
CPC ......... *H01F 17/0013* (2013.01); *H01F 1/053* (2013.01); *H01F 1/22* (2013.01);
(Continued)

(58) Field of Classification Search
CPC ............... H01F 17/0013; H01F 27/255; H01F 2017/048; H01F 17/04; H01F 27/2804;
(Continued)

(56) References Cited

U.S. PATENT DOCUMENTS 8,610,525 B2 * 12/2013 Matsuura ............ H01F 17/0033 336/200
9,892,843 B2 * 2/2018 Arai .................... H01F 17/0013
(Continued)

FOREIGN PATENT DOCUMENTS

JP 2013055315 A 3/2013
JP 2013055316 A 3/2013
JP 2017092431 A 5/2017

OTHER PUBLICATIONS

A Notice of Reasons for Refusal issued by the Japanese Patent Office, dated Apr. 26, 2022, for Japanese counterpart application No. 2018-185573. (3 pages).

*Primary Examiner* — Thiem D Phan
(74) *Attorney, Agent, or Firm* — Law Office of Katsuhiro Arai

(57) ABSTRACT

In an exemplary embodiment, a multilayer coil component includes: a substrate body; and a coil embedded in the substrate body and containing a wound conductor; wherein the substrate body has: magnetic layers containing multiple metal magnetic grains, provided around conductor layers that constitute parts of the wound conductor in a direction roughly orthogonal to the coil axis of the coil; and multiple high-hardness insulating grains harder than the multiple metal magnetic grains and smaller in average grain size than the multiple metal magnetic grains, provided between a pair of the conductor layers adjacent to each other in the direction of the coil axis and also between a pair of the magnetic layers adjacent to each other in the direction of the coil axis. The multilayer coil component can prevent shorting in the wound conductor while increasing the inductance.

9 Claims, 8 Drawing Sheets

(51) Int. Cl.
*H01Q 7/06* (2006.01)
*H01F 1/22* (2006.01)
*H01F 41/02* (2006.01)
*H01F 1/053* (2006.01)

(52) U.S. Cl.
CPC ........... *H01F 41/0253* (2013.01); *H01Q 7/06* (2013.01); *Y10T 29/53178* (2015.01)

(58) Field of Classification Search
CPC ............. H01F 2027/2809; H01F 41/16; H01F 27/327; H01F 41/041; H01F 41/04; H01F 41/127; Y10T 29/53178
USPC ............... 29/740, 602.1, 604, 606, 609, 738
See application file for complete search history.

(56) References Cited

U.S. PATENT DOCUMENTS

| | | | |
|---|---|---|---|
| 2013/0033347 | A1 | 2/2013 | Matsuura et al. |
| 2013/0038419 | A1 | 2/2013 | Kobayashi et al. |
| 2017/0140864 | A1 | 5/2017 | Arai et al. |

* cited by examiner

MULTILAYER COIL COMPONENT AND ELECTRONIC DEVICE

CROSS-REFERENCE TO RELATED APPLICATIONS

The present application claims priority to Japanese Patent Application No. 2018-185573, filed Sep. 28, 2018, the disclosure of which is incorporated herein by reference in its entirety including any and all particular combinations of the features disclosed therein.

BACKGROUND

Field of the Invention

The present invention relates to a multilayer coil component and an electronic device.

Description of the Related Art

Increase in the current capacities of multilayer coil components is driving the use of metal magnetic materials, in place of ferrite materials, as their magnetic bodies. Taking advantage of the lower insulating properties of metal magnetic materials compared to ferrite materials, various arts have been proposed that can prevent shorting in the coil conductor while ensuring high inductance. For example, multilayer coil components are known, each comprising an internal conductor region in which a coil conductor is provided, and cover regions on top and bottom thereof that include soft magnetic alloy grains constituted by the same types of elements as, and larger in average grain size than, the soft magnetic alloy grains contained in the internal conductor region (refer to Patent Literature 1, for example). For example, multilayer coil components are known, each comprising internal-conductor-forming layers containing internal conductors that constitute parts of a coil conductor, being stacked alternately with magnetic layers containing soft magnetic alloy grains constituted by the same types of elements as, and smaller in average grain size than, the soft magnetic alloy grains contained in the internal-conductor-forming layers (refer to Patent Literature 2, for example).

Also known are multilayer coil components, each constituted in a manner containing three or more alloy magnetic grains and also having magnetic layers that are placed in the coil conductor in the direction of the coil axis and arranged along the direction of the coil axis, in order to prevent the magnetic properties and insulating properties from dropping (refer to Patent Literature 3, for example).

BACKGROUND ART LITERATURES

[Patent Literature 1] Japanese Patent Laid-open No. 2013-55315

[Patent Literature 2] Japanese Patent Laid-open No. 2013-55316

[Patent Literature 3] Japanese Patent Laid-open No. 2017-92431

SUMMARY

The present invention is a multilayer coil component comprising: a substrate body; and a coil embedded in the substrate body and containing a wound conductor; wherein the substrate body has: magnetic layers containing multiple metal magnetic grains, provided around conductor layers that constitute parts of the wound conductor in a direction roughly orthogonal to the coil axis of the coil; and multiple high-hardness insulating grains harder than the multiple metal magnetic grains and smaller in average grain size than the multiple metal magnetic grains, provided between a pair of the conductor layers adjacent to each other in the direction of the coil axis and also between a pair of the magnetic layers adjacent to each other in the direction of the coil axis.

The present invention is an electronic device comprising: the aforementioned multilayer coil component; and a circuit board on which the multilayer coil component has been mounted.

BRIEF DESCRIPTION OF THE DRAWINGS

FIG. 1A is a perspective view of the multilayer coil component pertaining to Example 1, while

FIG. 3A is an enlarged view of Region A in FIG. 1B, while

DESCRIPTION OF THE SYMBOLS

Figure 1A:
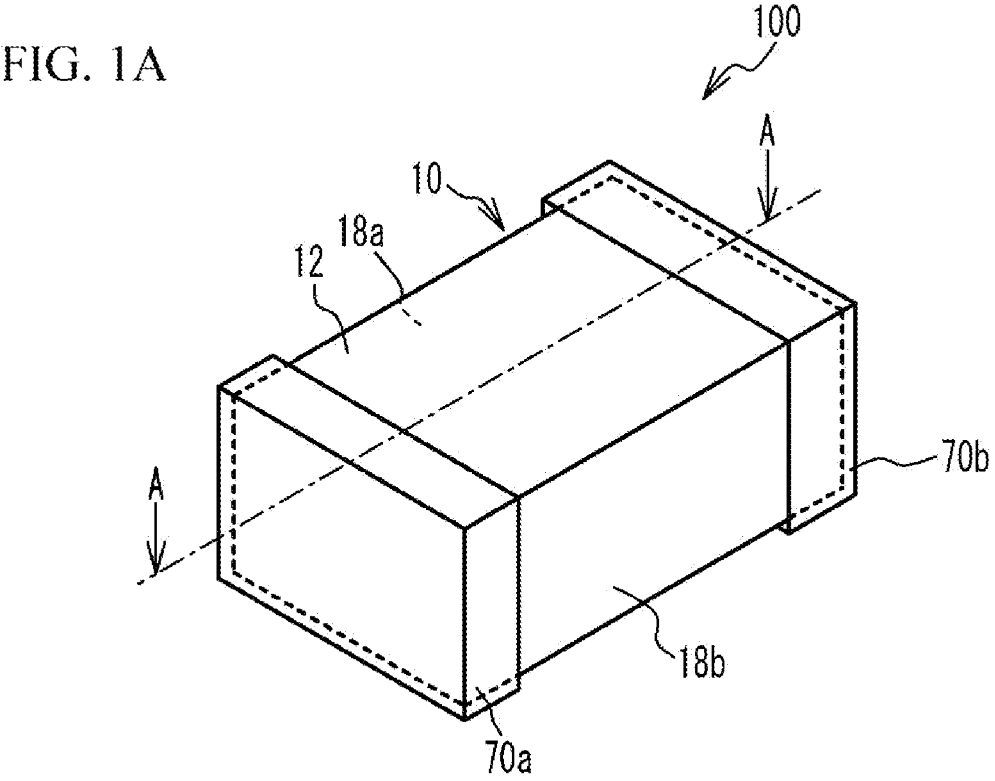

10 Substrate body
12 Top face
14 Bottom face
16*a*, 16*b* End face
18*a*, 18*b* Side face
20 Coil-embedded region
22 Cover region
24 Conductor-magnetic body combination layer
25 Inter-conductor layer
26 Intermediate layer
27 Inter-magnetic layer part
28 Cover layer
30 Magnetic layer
36 High-hardness insulating sheet
40 Metal magnetic grain
42 Insulating film
44 High-hardness insulating grain
50 Coil
52 Wound conductor
54*a*, 54*b* Lead conductor
56 Flat conductor
58 Connection conductor
60 Conductor layer
70*a*, 70*b* External electrode
80 Circuit board
82 Electrode
84 Solder
95 Inter-conductor layer

96 Intermediate layer
97 Inter-magnetic layer part
100, 1000 Multilayer coil component
300 Electronic device

DETAILED DESCRIPTION OF EMBODIMENTS

Examples of the present invention are explained below by referring to the drawings.

Example 1

Figure 1B:
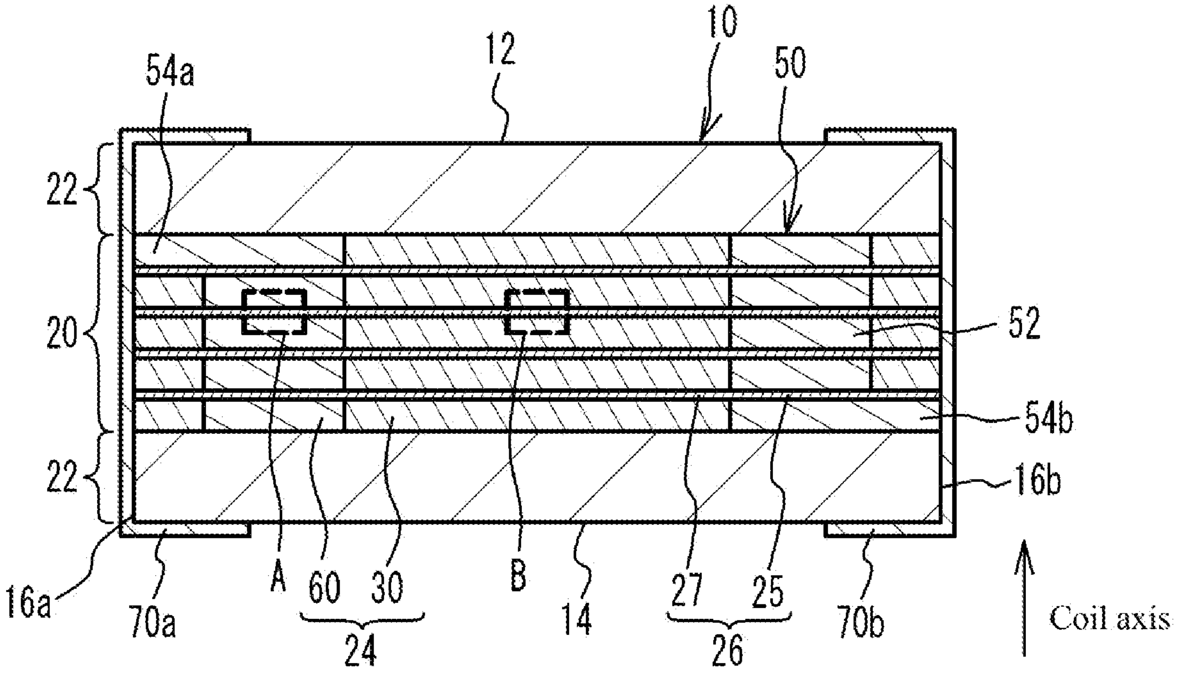
FIG. 1B is a view of cross-section A-A in FIG. 1A.

FIG. 1A is a perspective view of the multilayer coil component pertaining to Example 1, while FIG. 1B is a view of cross-section A-A in FIG. 1A. As shown in FIGS. 1A and 1B, the multilayer coil component 100 in Example 1 comprises a substrate body 10, a coil 50, and a pair of external electrodes 70*a*, 70*b*.

The substrate body 10 is shaped roughly as a rectangular solid having a top face 12, a bottom face 14, a pair of end faces 16*a*, 16*b*, and a pair of side faces 18*a*, 18*b*. The bottom face 14 is a mounting surface, while the top face 12 is a face on the opposite side of the bottom face 14. The end faces 16*a*, 16*b* are faces connected to the short sides of the top face 12 and bottom face 14. The side faces 18*a*, 18*b* are faces connected to the long sides of the top face 12 and bottom face 14. The substrate body 10 is not limited to one having a perfect rectangular solid shape, and it may be one whose apexes are each rounded, one whose ridges (boundaries of faces) are each rounded, or one whose faces are each curved, or the like, for example.

The coil 50 is embedded in the substrate body 10. The coil 50 includes a wound conductor 52 and lead conductors 54*a*, 54*b*. The lead conductor 54*a* is led out linearly from one end of the wound conductor 52 to the end face 16*a* of the substrate body 10. The lead conductor 54*b* is led out linearly from the other end of the wound conductor 52 to the end face 16*b* of the substrate body 10. The coil 50 has prescribed winding units, as well as a coil axis crossing roughly at right angles with the planes defined by the winding units. The coil 50 is formed by copper, aluminum, nickel, silver, platinum, palladium, or other metal material, or alloy material containing the foregoing, for example.

The substrate body 10 includes a coil-embedded region 20 having the coil 50 inside, and cover regions 22 provided on both sides of the coil-embedded region 20 in the direction of the coil axis. The coil-embedded region 20 will be described later. The cover region 22 is formed in a manner containing a magnetic material; for example, it is formed in a manner containing metal magnetic grains as its primary component. It should be noted that "containing . . . as its primary component" means that metal magnetic grains are contained by more than 50 percent by weight, or preferably 70 percent by weight or more, or more preferably 80 percent by weight or more, or yet more preferably 90 percent by weight or more, for example.

The external electrodes 70*a*, 70*b* are external terminals for surface mounting provided on the surface of the substrate body 10. The external electrode 70*a* extends from the bottom face 14, via the end face 16*a*, to the top face 12, while covering parts of the side faces 18*a*, 18*b*, of the substrate body 10. The external electrode 70*b* extends from the bottom face 14, via the end face 16*b*, to the top face 12, while covering parts of the side faces 18*a*, 18*b*, of the substrate body 10. In other words, the external electrodes 70*a*, 70*b* are five-sided electrodes covering five faces of the substrate body 10. It should be noted that the external electrodes 70*a*, 70*b* are not limited to five-sided electrodes, and they may be three-sided electrodes extending from the bottom face 14 via the end face 16*a* or 16*b* to the top face 12, or two-sided electrodes extending from the bottom face 14 to the end face 16*a* or 16*b*, or the like.

The external electrode 70*a* is connected to the lead conductor 54*a* which has been led out from one end of the wound conductor 52 to the end face 16*a* of the substrate body 10, at the end face 16*a*. The external electrode 70*b* is connected to the lead conductor 54*b* which has been led out from the other end of the wound conductor 52 to the end face 16*b* of the substrate body 10, at the end face 16*b*.

The external electrodes 70*a*, 70*b* are formed by multiple metal layers, for example. For example, the external electrodes 70*a*, 70*b* have a multilayer structure comprising a bottom layer formed by copper, aluminum, nickel, silver, platinum, palladium, or other metal material, or alloy material containing the foregoing, a middle layer formed by silver or conductive resin containing silver, and a top layer being a nickel and/or tin-plated layer. The layer structure of the external electrodes 70*a*, 70*b* is not limited to the one having the layers as illustrated, and there may be an intermediate layer between each adjacent pair of the layers, or there may be a topmost layer on top of the top layer, or the like.

Figure 2:
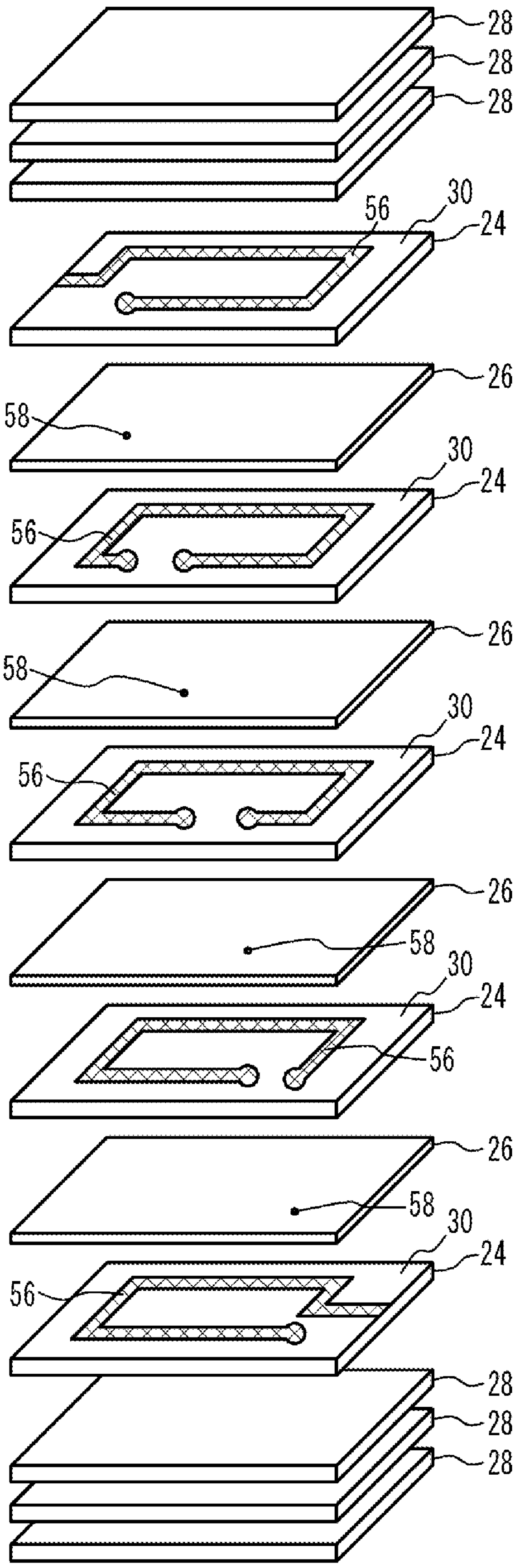
FIG. 2 is an exploded perspective view of the substrate body in Example 1.

FIG. 2 is an exploded perspective view of the substrate body in Example 1. As shown in FIG. 2, the substrate body 10 is structurally divided into multiple conductor-magnetic body combination layers 24, one or multiple intermediate layers 26, and one or multiple cover layers 28. The conductor-magnetic body combination layer 24 includes a flat conductor 56 and a magnetic layer 30 provided around the flat conductor 56. Formed in the intermediate layer 26 is a connection conductor 58 that penetrates through the intermediate layer 26 and connects to the flat conductor 56. The wound conductor 52 of the coil 50 is formed as a result of connection of the flat conductor 56 of the conductor-magnetic body combination layer 24 with the connection conductor 58 of the intermediate layer 26, and extends in a spiral manner. The cover region 22 in FIG. 1B is constituted by the one or multiple cover layers 28.

As shown in FIG. 1B, the coil-embedded region 20 is formed in a manner structurally divided into multiple conductor-magnetic body combination layers 24 alternating with one or multiple intermediate layers 26. In other words, the one or multiple intermediate layers 26 are placed between the multiple conductor-magnetic body combination layers 24. The result is that magnetic layers 30 are provided around the conductor layers 60 that constitute parts of the wound conductor 52 in a direction roughly orthogonal to the direction of the coil axis. An inter-conductor layer 25 is provided between a pair of conductor layers 60 adjacent to each other in the direction of the coil axis. An inter-magnetic layer part 27 is provided between a pair of magnetic layers 30 adjacent to each other in the direction of the coil axis.

It should be noted that, while the conductor-magnetic body combination layer 24 is illustrated as having a constant thickness in FIGS. 1B and 2 for the purpose of explanation, the thickness of the conductor layer 60 may vary from that of the magnetic layer 30. Likewise, while the intermediate layer 26 is illustrated as having a constant thickness for the purpose of explanation, the thickness of the inter-conductor layer 25 positioned between the conductor layers 60 may vary from that of the inter-magnetic layer part 27 positioned between the magnetic layers 30. Also, the inter-magnetic layer part 27 may be partially discontinuous. In some embodiments, although the boundary between the inter-magnetic layer part 27 and the magnetic layer 30 may not be clear, the boundary can be defined as if the inter-magnetic layer part 27 has a thickness which is substantially the same as that of the inter-conductor layer 25. In some embodiments, the inter-magnetic layer part 27 is a layer or portion having a density higher than that of the magnetic body 30. In some embodiments, the quantity of the high-hardness insulating grains is such that when some metal magnetic grains penetrate through the boundary into the inter-magnetic layer part 27, the gaps among the metal magnetic grains can substantially be filled with the high-hardness insulating grains.

Figure 3A:
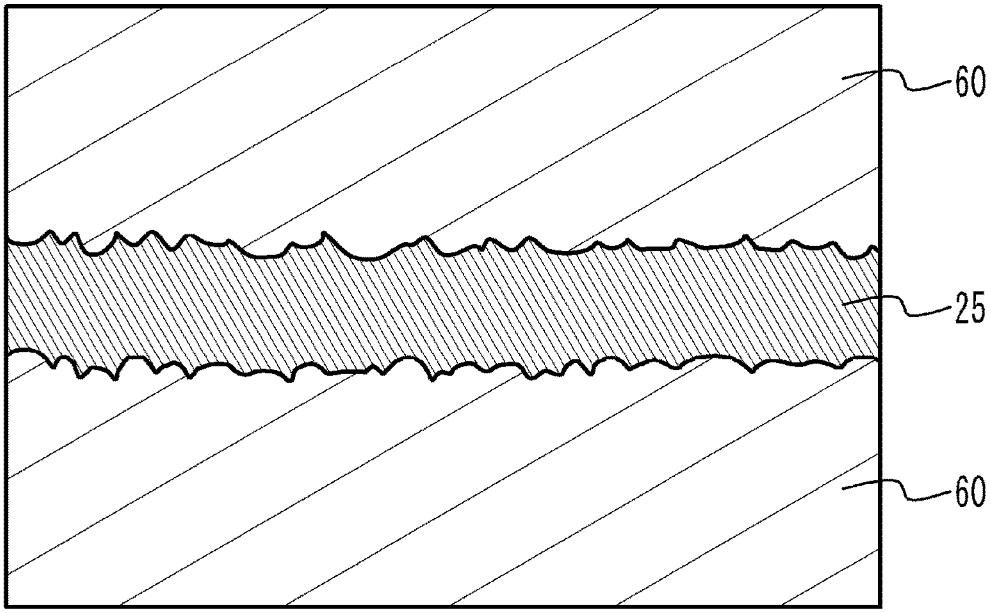
Figure 3B:
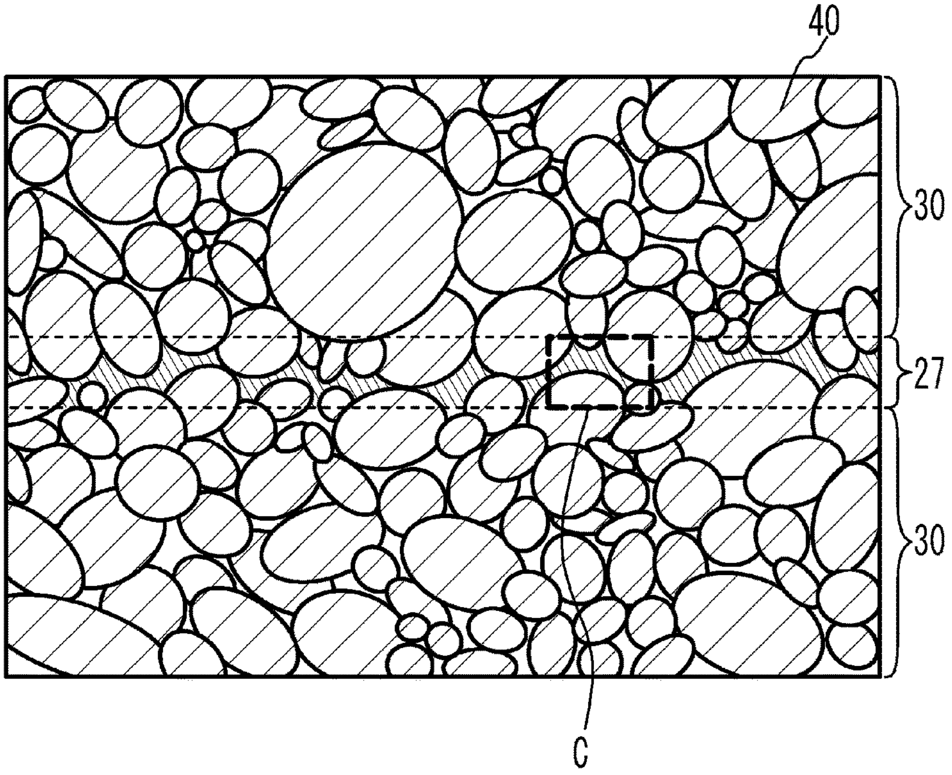
FIG. 3B is an enlarged view of Region B in FIG. 1B.
Figure 4:
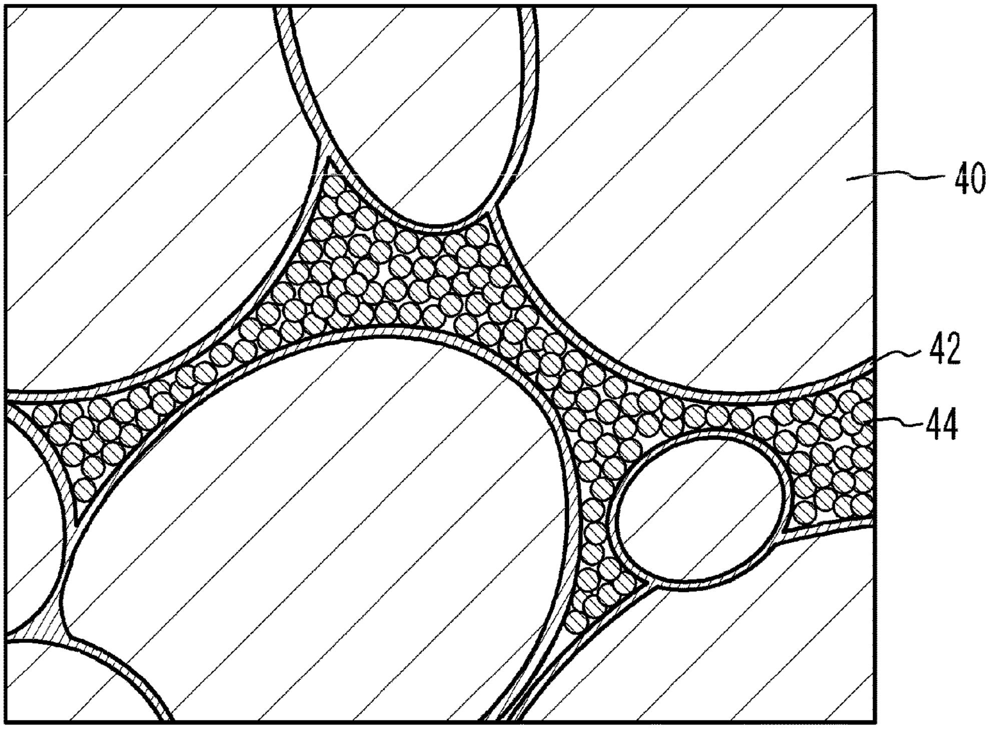
FIG. 4 is an enlarged view of Region C in FIG. 3B.

FIG. 3A is an enlarged view of Region A in FIG. 1B, while FIG. 3B is an enlarged view of Region B in FIG. 1B. FIG. 4 is an enlarged view of Region C in FIG. 3B. As shown in FIGS. 3A, 3B and 4, an inter-conductor layer 25 is provided between a pair of conductor layers 60 adjacent to each other in the direction of the coil axis. An inter-magnetic layer part 27 is provided between a pair of magnetic layers 30 adjacent to each other in the direction of the coil axis. The magnetic layer 30 has insulating property and is formed in a manner containing metal magnetic grains 40 as its primary component. The metal magnetic grains 40 have been insulation-treated through formation of an insulating film 42 on their surface, for example. The magnetic layer 30 is formed through inter-bonding of the insulating films 42 formed on the surfaces of the metal magnetic grains 40. The average grain size of the metal magnetic grains 40 contained in the magnetic layer 30 is 4 μm or greater but no greater than 20 μm, for example. The average grain size can be determined by observing a cross-section using a scanning electron microscope (SEM), and the like, measuring the diameters of the metal magnetic grains 40 observed, and obtaining the average value thereof. It should be noted that "containing metal magnetic grains 40 as its primary component" means that metal magnetic grains 40 are contained by more than 50 percent by weight, or preferably 70 percent by weight or more, or more preferably 80 percent by weight or more, or yet more preferably 90 percent by weight or more, for example.

The metal magnetic grains 40 may be metal magnetic grains constituted by FeSiCr, FeSiAl, FeSiCrAl, or other soft magnetic metal, Fe, Ni, or other magnetic metal, amorphous magnetic metal, or nanocrystal magnetic metal, for example. The insulating film 42 may be silicone oxide or other inorganic insulator, for example. It should be noted that the magnetic layer 30 may be formed by a resin that contains metal magnetic grains 40. In this case, the resin may be epoxy resin, silicone resin, phenolic resin, or other thermosetting resin, or polyamide resin, fluororesin, or other thermoplastic resin.

The inter-conductor layer 25 has insulating property and is formed in a manner containing, as its primary component, high-hardness insulating grains 44 which are harder and smaller in average grain size than the magnetic grains 40 contained in the magnetic layer 30. The average grain size of the high-hardness insulating grains 44 contained in the inter-conductor layer 25 is 0.1 μm or greater but no greater than 2 μm, for example. The average grain size can be determined by observing a cross-section using a SEM, and the like, measuring the diameters of the high-hardness insulating grains 44 observed, and obtaining the average value thereof. It should be noted that "containing, as its primary component, high-hardness insulating grains 44" means that high-hardness insulating grains 44 are contained by more than 50 percent by weight, or preferably 70 percent by weight or more, or more preferably 80 percent by weight or more, or yet more preferably 90 percent by weight or more.

The inter-magnetic layer part 27 has insulating property and is formed in a manner containing the metal magnetic grains 40 contained in the magnetic layer 30, as well as the high-hardness insulating grains 44 which are harder and smaller in average grain size than the magnetic grains 40 contained in the magnetic layer 30. The metal magnetic grains 40 have been insulation-treated through formation of an insulating film 42 on their surface, for example. The average grain size of the high-hardness insulating grains 44 contained in the inter-magnetic layer part 27 is 0.1 μm or greater but no greater than 2 μm, for example. The average grain size can be determined by the same method described above.

In one example, the high-hardness insulating grains 44 are metal magnetic grains that have been insulation-treated through formation of an insulating film (not illustrated) on their surface. The high-hardness insulating grains 44 may have different constituent elements from those of the metal magnetic grains 40 contained in the magnetic layer 30, or they may have the same constituent elements but different composition ratios. The high-hardness insulating grains 44 may be metal magnetic grains constituted by FeSiCr, FeSiAl, FeSiCrAl, or other soft magnetic metal, for example. In this disclosure, the "high"-hardness refers to an average or representative hardness which is relatively higher than that of metal magnetic grains without restricting the hardness to particular units or numbers. In some embodiments, the hardness can be evaluated or determined based on the constituent elements and composition ratios of the grains themselves, regardless of the shape, size, etc. of the grains.

The thickness of the conductor layer 60 in the direction of the coil axis is 10 μm or greater but no greater than 200 μm, for example. The spacing of the conductor layers 60 in the direction of the coil axis (or specifically the thickness of the inter-conductor layer 25 in the direction of the coil axis) is 3 μm or greater but no greater than 15 μm, for example.

Figure 5A:
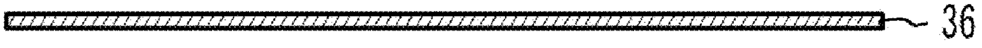
FIGS. 5A to 5C are cross-sectional views illustrating how the multilayer coil component pertaining to Example 1 is manufactured.
Figure 5B:
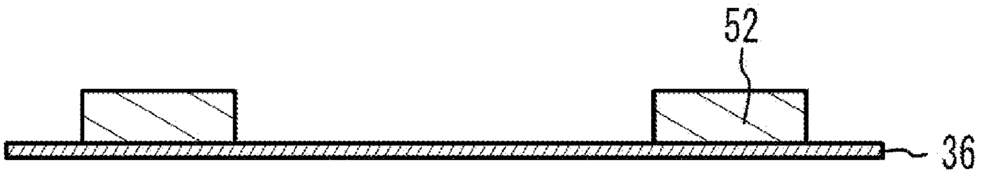
Figure 5C:
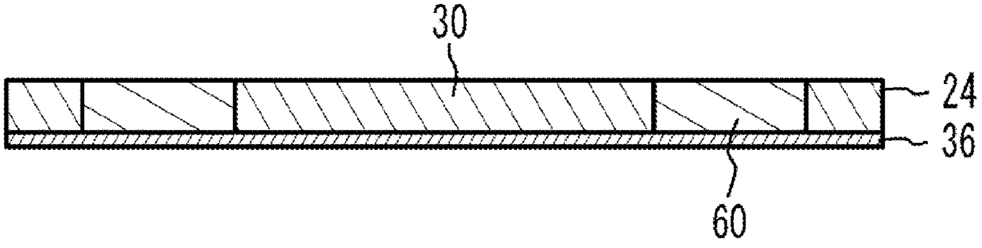

Next, one example of the method for manufacturing the multilayer coil component 100 in Example 1 is explained. FIGS. 5A to 5C are cross-sectional views illustrating how the multilayer coil component pertaining to Example 1 is manufactured. It should be noted that FIGS. 5A to 5C show cross-sectional views relating to the method for manufacturing the conductor-magnetic body combination layer 24 and the intermediate layer 26. As shown in FIG. 5A, a paste (slurry) containing high-hardness insulating grains 44, prepared beforehand, is applied on a film using the doctor blade method, and the like, to form a high-hardness insulating sheet 36.

As shown in FIG. 5B, through holes (not illustrated) are formed by means of laser processing, and the like, at prescribed positions, or specifically positions where connection conductors 58 will be formed, in the high-hardness insulating sheet 36. Next, a conductive metal paste is printed on the high-hardness insulating sheet 36 using a printing method (such as the screen printing method) to form precursors of wound conductor 52 and lead conductors 54*a*, 54*b*. In FIG. 5B, lead conductors 54*a*, 54*b* are not illustrated. When given the heat treatment described later, these will become a wound conductor 52 and lead conductors 54*a*, 54*b*.

As shown in FIG. 5C, a magnetic body paste (slurry) containing metal magnetic grains 40, prepared beforehand, is printed around the wound conductor 52 on the high-hardness insulating sheet 36 using a printing method (such as the screen printing method) to form a magnetic layer 30. This way, a conductor-magnetic body combination layer 24 that includes a conductor layer 60 constituting a part of the wound conductor 52 and a magnetic layer 30, is formed on the high-hardness insulating sheet 36.

A cover layer 28 is formed like a sheet by applying a magnetic body paste (slurry), prepared beforehand, onto a film using the doctor blade method, and the like.

Next, high-hardness insulating sheets 36, each having a conductor-magnetic body combination layer 24 formed on it, and cover layers 28, are stacked in a prescribed order and then pressure-bonded by applying pressure in the stacking direction, to obtain a laminate. When pressure is applied, the portion of the high-hardness insulating sheet 36 sandwiched by the magnetic layers 30 assumes a structure where the high-hardness insulating grains 44 have entered the voids between the metal magnetic grains 40, and an inter-magnetic body layer part 27 is formed as a result. In the portion of the high-hardness insulating sheet 36 sandwiched by the conductor layers 60, on the other hand, the conductor layers 60 are densely formed by conductive metal grains of fine grain sizes and therefore the high-hardness insulating grains 44 do not enter the voids between these grains. In this portion, an inter-conductor layer 25 having the high-hardness insulating grains 44 as its primary component, is formed. The inter-magnetic layer part 27 contains the metal magnetic grains 40 and high-hardness insulating grains 44. The inter-conductor layer 25 does not contain the metal magnetic grains 40, but it contains the high-hardness insulating grains 44. An intermediate layer 26 is constituted by these inter-magnetic layer part 27 and inter-conductor layer 25. The laminate, thus obtained, is cut to individual chips, which are then sintered at a prescribed temperature (such as 700° C. to 900° C.), to form substrate body 10.

Next, external electrodes 70*a*, 70*b* are formed at prescribed positions on each such substrate body 10. The external electrodes 70*a*, 70*b* are formed by, for example, applying an electrode paste, sintering it at a prescribed temperature (such as 500° C. to 700° C.), and then providing plating on top. This way, the multilayer coil component 100 in Example 1 is formed.

Figure 6:
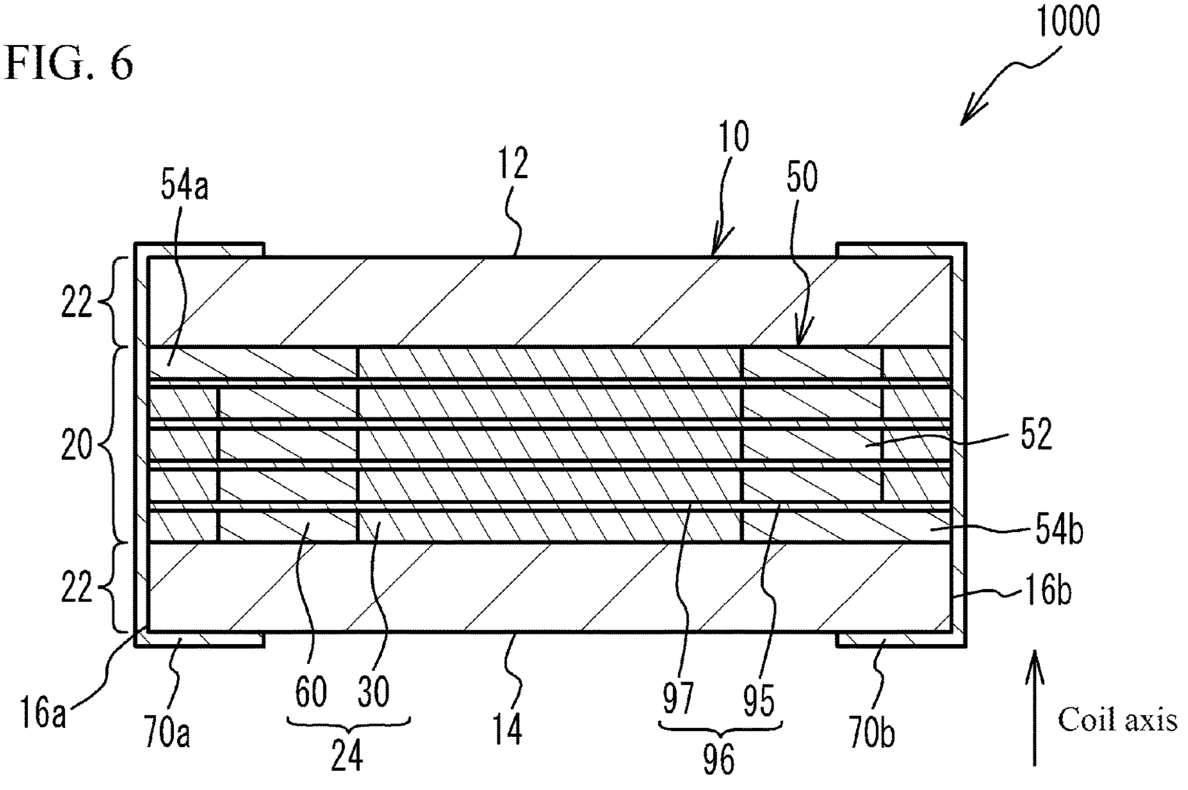
FIG. 6 is a cross-sectional view of the multilayer coil component pertaining to Comparative Example 1.

Next, the multilayer coil component pertaining to Comparative Example 1 is explained. FIG. 6 is a cross-sectional view of the multilayer coil component pertaining to Comparative Example 1. As shown in FIG. 6, the multilayer coil component 1000 in Comparative Example 1 is formed in a manner structurally divided into multiple conductor-magnetic body combination layers 24 alternating with one or multiple intermediate layers 96. An inter-conductor layer 95 provided between the conductor layers 60, and inter-magnetic layer part 97 provided between the magnetic layers 30, contain metal magnetic grains whose constituent elements and their composition are the same as those of the metal magnetic grains 40 contained in the magnetic layer 30. The remaining constitutions are the same as those in Example 1 and therefore not explained.

Now, experiments involving inductance measurement for Example 1 and Comparative Example 1 are explained. Two experiments were conducted by varying the average grain size of the metal magnetic grains 40 contained in the magnetic layer 30. Table 1 is a table showing the compositions and average grain sizes, among others, of the grains contained in the magnetic layers 30, inter-conductor layers 25, 95, and inter-magnetic layer parts 27, 97, as well as the measured results of inductances (L-value), obtained in the first experiment.

TABLE 1

| | | Magnetic layer | | Inter-conductor layer, inter-magnetic layer part | | | | |
|---|---|---|---|---|---|---|---|---|
| | | Composition (wt %) | Grain size (μm) | Composition (wt %) | Grain size (μm) | Grain size ratio (%) | Conductor spacing (μm) | L-value (μH) |
| Comparative Example 1 | Sample 1 | 4.5Cr—3.5Si | 10 | 4.5Cr—3.5Si | 2 | 20 | 12 | 1.00 |
| Example 1 | Sample 1 | 4.5Cr—3.5Si | 10 | 4.5Cr—6.5Si | 2 | 20 | 12 | 1.15 |
| | Sample 2 | 4.5Cr—3.5Si | 10 | 4.5Cr—6.5Si | 0.8 | 8 | 4.8 | 1.23 |
| | Sample 3 | 4.5Cr—3.5Si | 10 | 4.5Cr—6.5Si | 0.5 | 5 | 3 | 1.41 |
| | Sample 4 | 4.5Cr—3.5Si | 10 | 4.5Al—6.5Si | 2 | 20 | 12 | 1.20 |

As shown in Table 1, the first experiment used FeCrSi alloy magnetic grains of 10 μm in average grain size for the metal magnetic grains 40 contained in the magnetic layer 30, in all of Sample 1 of Comparative Example 1, and Samples 1 to 4 of Example 1, with the composition ratios of the respective elements adjusted to 92 percent by weight for Fe, 4.5 percent by weight for Cr, and 3.5 percent by weight for Si. Also, in Sample 1 of Comparative Example 1, FeCrSi alloy magnetic grains of the same composition as that of the metal magnetic grains 40 contained in the magnetic layer 30 were used for the metal magnetic grains contained in the inter-conductor layer 95 and inter-magnetic layer part 97, except that their average grain size was varied to 2 μm. This brought the grain size ratio, which represents the percentage of the average grain size of the metal magnetic grains contained in the inter-conductor layer 95 and inter-magnetic layer part 97, to the average grain size of the metal magnetic grains 40 contained in the magnetic layer 30, to 20%. Also, the spacing of the conductor layers 60 in the direction of the coil axis was 12 μm.

Sample 1 in Example 1 used FeCrSi alloy magnetic grains of 2 μm in average grain size for the high-hardness insulating grains 44 contained in the inter-conductor layer 25 and inter-magnetic layer part 27, with the composition ratios of the respective elements adjusted to 89 percent by weight for Fe, 4.5 percent by weight for Cr, and 6.5 percent by weight for Si. This brought the grain size ratio, which represents the percentage of the average grain size of the high-hardness insulating grains 44 contained in the inter-conductor layer 25 and inter-magnetic layer part 27, to the average grain size of the metal magnetic grains 40 contained in the magnetic body 30, to 20%. The spacing of the conductor layers 60 in the direction of the coil axis was 12 μm.

Sample 2 in Example 1 used FeCrSi alloy magnetic grains of the same composition as that of the high-hardness insulating grains 44 from Sample 1 in Example 1 for the high-hardness insulating grains 44 contained in the inter-conductor layer 25 and inter-magnetic layer part 27, with their average grain size adjusted to 0.8 μm. The grain size ratio was 8%. The spacing of the conductor layers 60 in the direction of the coil axis was 4.8 μm.

Sample 3 in Example 1 used FeCrSi alloy magnetic grains of the same composition as that of the high-hardness insulating grains 44 from Sample 1 in Example 1 for the high-hardness insulating grains 44 contained in the inter-conductor layer 25 and inter-magnetic layer part 27, with their average grain size adjusted to 0.5 μm. The grain size ratio was 5%. The spacing of the conductor layers 60 in the direction of the coil axis was 3 μm.

Sample 4 in Example 1 used FeAlSi alloy magnetic grains of 2 μm in average grain size for the high-hardness insulating grains 44 contained in the inter-conductor layer 25 and inter-magnetic layer part 27, with the composition ratios of the respective elements adjusted to 89 percent by weight for Fe, 4.5 percent by weight for Al, and 6.5 percent by weight for Si. The grain size ratio was 20%. The spacing of the conductor layers 60 in the direction of the coil axis was 12 μm.

In Samples 1 to 3 of Example 1, the high-hardness insulating grains 44 contained in the inter-conductor layer 25 and inter-magnetic layer part 27, although formed by the same constituent elements as those of the metal magnetic grains 40 contained in the magnetic layer 30, are harder than the metal magnetic grains 40 because their Si composition ratio is higher. Also, in Sample 4 of Example 1, the high-hardness insulating grains 44 contained in the inter-conductor layer 25 and inter-magnetic layer part 27, which are formed by different constituent elements from those of the metal magnetic grains 40 contained in the magnetic layer 30, are harder than the metal magnetic grains 40 because their Si composition ratio is higher.

As shown in Table 1, the inductance (L-value) was 1.00 μH in Sample 1 of Comparative Example 1, but it was 1.15 μH in Sample 1, 1.23 μH in Sample 2, 1.41 μH in Sample 3, and 1.20 μH in Sample 4, of Example 1. This shows that the inductance increased in Example 1 from the level in Comparative Example 1.

Table 2 is a table showing the compositions, average grain sizes, and the like, of the grains contained in the magnetic layers 30, inter-conductor layers 25, 95, and inter-magnetic layer parts 27, 97, as well as the measured results of inductances, obtained in the second experiment.

metal magnetic grains 40 contained in the magnetic layer 30, in all of Sample 2 of Comparative Example 1 and Samples 5 and 6 of Example 1, with the composition ratios of the respective elements adjusted to 92 percent by weight for Fe, 4.5 percent by weight for Cr, and 3.5 percent by weight for Si. Also, in Sample 2 of Comparative Example 1, FeCrSi alloy magnetic grains of the same composition as that of the metal magnetic grains 40 contained in the magnetic layer 30 were used for the metal magnetic grains contained in the inter-conductor layer 95 and inter-magnetic layer part 97, except that their average grain size was varied to 1 μm. The grain size ratio was 17%. The spacing of the conductor layers 60 in the direction of the coil axis was 6 μm.

Sample 5 in Example 1 used FeCrSi alloy magnetic grains of 1 μm in average grain size for the high-hardness insulating grains 44 contained in the inter-conductor layer 25 and inter-magnetic layer part 27, with the composition ratios of the respective elements adjusted to 89 percent by weight for Fe, 4.5 percent by weight for Cr, and 6.5 percent by weight for Si. The grain size ratio was 17%. The spacing of the conductor layers 60 in the direction of the coil axis was 6 μm.

Sample 6 in Example 1 used FeAlSi alloy magnetic grains of 1 μm in average grain size for the high-hardness insulating grains 44 contained in the inter-conductor layer 25 and inter-magnetic layer part 27, with the composition ratios of the respective elements adjusted to 89 percent by weight for Fe, 4.5 percent by weight for Al, and 6.5 percent by weight for Si. The grain size ratio was 17%. The spacing of the conductor layers 60 in the direction of the coil axis was 6 μm.

In Samples 5 and 6 of Example 1, the high-hardness insulating grains 44 contained in the inter-conductor layer 25 and inter-magnetic layer part 27 are also harder than the metal magnetic grains 40 contained in the magnetic layer 30, just like in Samples 1 to 4 of Example 1.

As shown in Table 2, the inductance was 0.80 μH in Sample 2 of Comparative Example 1, but it was 0.90 μH in Sample 5 and 0.91 μH in Sample 6, of Example 1. This shows that the inductance increased in Example 1 from the level in Comparative Example 1.

The inductance increased in Example 1 from the level in Comparative Example 1, probably for the reason described below. In Comparative Example 1, the inter-conductor layer

TABLE 2

| | | Magnetic layer | | Inter-conductor layer, inter-magnetic layer part | | | | |
|---|---|---|---|---|---|---|---|---|
| | | Composition (wt %) | Grain size (μm) | Composition (wt %) | Grain size (μm) | Grain size ratio (%) | Conductor spacing (μm) | L-value (μH) |
| Comparative Example 1 | Sample 2 | 4.5Cr—3.5Si | 6 | 4.5Cr—3.5Si | 1 | 17 | 6 | 0.80 |
| Example 1 | Sample 5 | 4.5Cr—3.5Si | 6 | 4.5Cr—6.5Si | 1 | 17 | 6 | 0.90 |
| | Sample 6 | 4.5Cr—3.5Si | 6 | 4.5Al—6.5Si | 1 | 17 | 6 | 0.91 |

As shown in Table 2, the second experiment used FeCrSi alloy magnetic grains of 6 μm in average grain size for the

95 between the conductor layers 60, and inter-magnetic layer part 97 between the magnetic layers 30, are formed in a manner containing metal magnetic grains that have the same constituent elements and same composition ratios as those of the metal magnetic grains 40 contained in the magnetic layer 30. Because of this, it is considered that, when the intermediate layers 96, each having a conductor-magnetic body combination layer 24 formed on it, are pressure-bonded with the cover layers 28 under pressure applied in the stacking direction in the manufacturing method described above, the metal magnetic grains mesh with one another while deforming slightly. It is believed that this reduces the movements of the metal magnetic grains, which consequently keeps the fill ratio of the metal magnetic grains from increasing easily. This is likely why the inductance does not increase easily.

In Example 1, on the other hand, the inter-conductor layer 25 between the conductor layers 60, and inter-magnetic layer part 27 between the magnetic layers 30, are formed in a manner containing high-hardness insulating grains 44 which are harder and smaller in average grain size than the metal magnetic grains 40 contained in the magnetic layer 30. Since the high-hardness insulating grains 44 are harder, it is considered that, when the high-hardness insulating sheets 36, each having a conductor-magnetic body combination layer 24 formed on it, are pressure-bonded with the cover layers 28 under pressure applied in the stacking direction in the manufacturing method described above, the high-hardness insulating grains 44 do not deform easily and thus enter the voids between the metal magnetic grains 40. As the high-hardness insulating grains 44 were metal magnetic grains, the fact that the high-hardness insulating grains 44 entered the voids between the metal magnetic grains 40 likely raised the fill ratio of the metal magnetic grains and consequently increased the inductance. Also, a smaller average grain size of the high-hardness insulating grains 44 means the voids between the high-hardness insulating grains 44 are smaller and the spacing of the pair of conductor layers 60 adjacent to each other in the direction of the coil axis is narrower. This allows for increase in the winding density of the coil 50, which is likely why the inductance increased.

As explained above, the substrate body 10 according to Example 1 has, between the pair of conductor layers 60 adjacent to each other in the direction of the coil axis and between the pair of magnetic layers 30 adjacent to each other in the direction of the coil axis, high-hardness insulating grains 44 which are harder and smaller in average grain size than the metal magnetic grains 40 contained in the magnetic layer 30. As a result, as described above, the fill ratio of the metal magnetic grains can be increased, while at the same time the spacing of the conductor layers 60 can be narrowed to increase the winding density of the coil 50, which allows for increase in the inductance along with size reduction (lowering of height).

From the viewpoint of increasing the fill ratio of the metal magnetic grains and also narrowing the spacing of the conductor layers 60, the average grain size of the high-hardness insulating grains 44 is preferably no greater than one-fifth, or more preferably no greater than one-tenth, or yet more preferably no greater than one-twentieth, the average grain size of the metal magnetic grains 40. For example, the average grain size of the metal magnetic grains 40 is preferably 4 μm or greater but no greater than 10 μm, or more preferably 4 μm or greater but no greater than 8 μm, or yet more preferably 4 μm or greater but no greater than 6 μm. For example, the average grain size of the high-hardness insulating grains 44 is preferably 0.1 μm or greater but no greater than 1 μm, or more preferably 0.1 μm or greater but no greater than 0.7 μm, or yet more preferably 0.1 μm or greater but no greater than 0.4 μm.

The high-hardness insulating grains 44 may be metal magnetic grains having the same constituent elements as, but different composition ratios from, those of the metal magnetic grains 40, or they may be magnetic grains different from the metal magnetic grains 40. Forming the high-hardness insulating grains 44 from a magnetic material allows the inductance to be increased effectively. It should be noted that, while Tables 1 and 2 showed examples where the high-hardness insulating grains 44 are of metal magnetic materials, they may be of magnetic materials other than metal magnetic materials, such as ferrite materials.

The narrower the spacing of the pair of conductor layers 60 adjacent to each other in the direction of the coil axis, the higher the winding density of the coil 50 can be, which means that the spacing of the conductor layers 60 (or specifically the thickness of the inter-conductor layer 25) is preferably thinner than the conductor layer 60, or more preferably no greater than one-half, or yet more preferably no greater than one-fifth, the thickness of the conductor layer 60. It should be noted that a smaller average grain size of the high-hardness insulating grains 44 improves the insulating property of the inter-conductor layer 25 and thereby makes shorting between the conductor layers 60 less likely.

Figure 7:
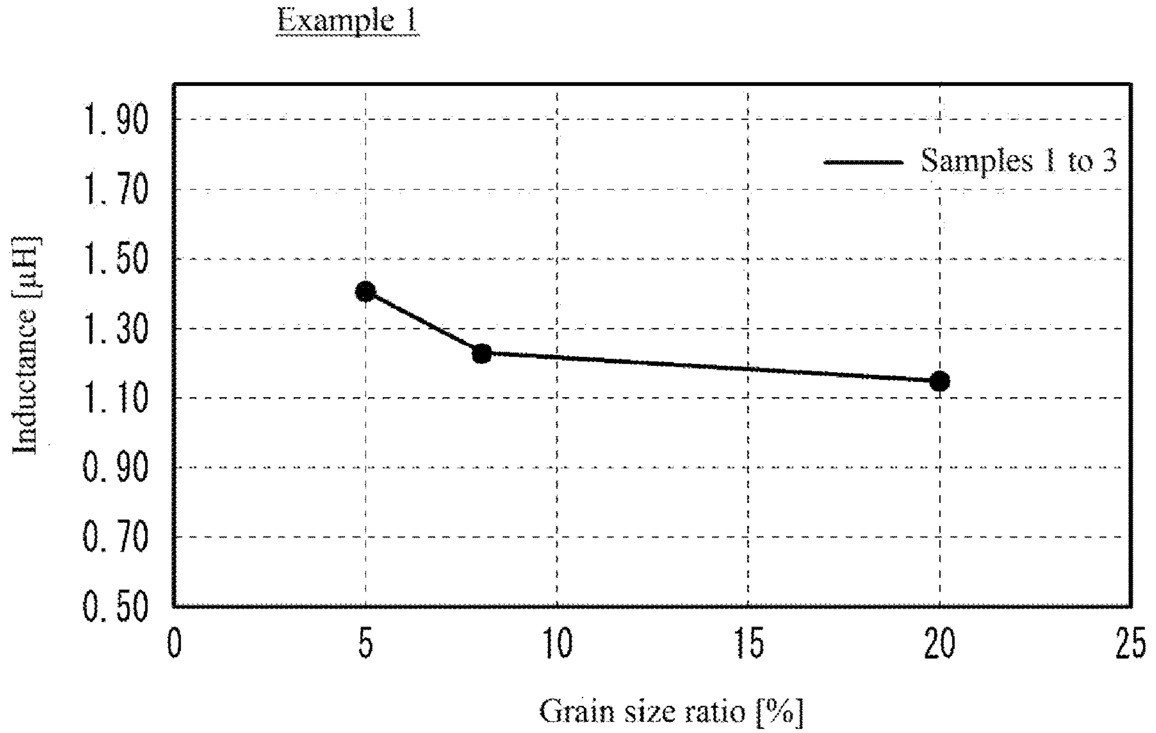
FIG. 7 is a diagram showing the correlation of grain size ratio and inductance relating to Samples 1 to 3 in Example 1.

FIG. 7 is a diagram showing the correlation of grain size ratio and inductance relating to Samples 1 to 3 in Example 1. In FIG. 7, the horizontal axis represents the grain size ratio, which is the percentage of the average grain size of the high-hardness insulating grains 44 to the average grain size of the metal magnetic grains 40. The vertical axis represents the inductance. As shown in FIG. 7, the smaller the grain size ratio, the higher the inductance becomes. This is probably because the smaller the grain size ratio, the thinner the inter-conductor layer 25 becomes and the narrower the spacing of the pair of conductor layers 60 adjacent to each other in the direction of the coil axis becomes, thereby allowing the winding density of the coil 50 to be increased.

Accordingly, the grain size ratio is preferably smaller, and based on FIG. 7, the grain size ratio is preferably 8% or smaller, or more preferably 5% or smaller, or yet more preferably 3% or smaller, when the high-hardness insulating grains 44 are magnetic grains.

Example 2

Example 1 illustrated examples where the high-hardness insulating grains 44 were magnetic grains. Example 2 explains cases where the high-hardness insulating grains 44 are non-magnetic grains. Non-magnetic grains include, for example, aluminum oxide grains, titanium oxide grains, zirconium oxide grains, magnesium oxide grains, and other inorganic oxide grains.

Tables 3 and 4 are used to explain experiments involving inductance measurement for Example 2 and Comparative Example 1. Table 3 is a table showing the compositions and average grain sizes, and the like, of the grains contained in the magnetic layers 30, inter-conductor layers 25, 95, and inter-magnetic layer parts 27, 97, as well as the measured results of inductances, obtained in the third experiment.

TABLE 3

| | | Magnetic layer | | Inter-conductor layer, inter-magnetic layer part | | Grain | | |
|---|---|---|---|---|---|---|---|---|
| | | Composition (wt %) | Grain size (μm) | Composition (wt %) | Grain size (μm) | size ratio (%) | Conductor spacing (μm) | L-value (μH) |
| Comparative Example 1 | Sample 1 | 4.5Cr—3.5Si | 10 | 4.5Cr—3.5Si | 2 | 20 | 12 | 1.00 |
| Example 2 | Sample 1 | 4.5Cr—3.5Si | 10 | $Al_2O_3$ | 1.5 | 15 | 9 | 1.07 |
| | Sample 2 | 4.5Cr—3.5Si | 10 | $Al_2O_3$ | 0.7 | 7 | 4.2 | 1.10 |
| | Sample 3 | 4.5Cr—3.5Si | 10 | $Al_2O_3$ | 0.5 | 5 | 3 | 1.29 |
| | Sample 4 | 4.5Cr—3.5Si | 10 | $Al_2O_3$ | 0.1 | 1 | 0.6 | 1.43 |

As shown in Table 3, the third experiment used FeCrSi alloy magnetic grains of 10 μm in average grain size for the metal magnetic grains 40 contained in the magnetic layer 30, in all of Sample 1 of Comparative Example 1 and Samples 1 to 4 of Example 2, with the composition ratios of the respective elements adjusted to 92 percent by weight for Fe, 4.5 percent by weight for Cr, and 3.5 percent by weight for Si. Also, in Sample 1 of Comparative Example 1, FeCrSi alloy magnetic grains of the same composition as that of the metal magnetic grains 40 contained in the magnetic layer 30 were used for the metal magnetic grains contained in the inter-conductor layer 95 and inter-magnetic layer part 97, except that their average grain size was varied to 2 μm. The grain size ratio was 20%. The spacing of the conductor layers 60 in the direction of the coil axis was 12 μm.

Sample 1 in Example 2 used aluminum oxide grains of 1.5 μm in average grain size for the high-hardness insulating grains 44 contained in the inter-conductor layer 25 and inter-magnetic layer part 27. The grain size ratio was 15%. The spacing of the conductor layers 60 in the direction of the coil axis was 9 μm.

Sample 2 in Example 2 used aluminum oxide grains of 0.7 μm in average grain size for the high-hardness insulating grains 44 contained in the inter-conductor layer 25 and inter-magnetic layer part 27. The grain size ratio was 7%. The spacing of the conductor layers 60 in the direction of the coil axis was 4.2 μm.

Sample 3 in Example 2 used aluminum oxide grains of 0.5 μm in average grain size for the high-hardness insulating grains 44 contained in the inter-conductor layer 25 and inter-magnetic layer part 27. The grain size ratio was 5%. The spacing of the conductor layers 60 in the direction of the coil axis was 3 μm.

Sample 4 in Example 2 used aluminum oxide grains of 0.1 μm in average grain size for the high-hardness insulating grains 44 contained in the inter-conductor layer 25 and inter-magnetic layer part 27. The grain size ratio was 1%. The spacing of the conductor layers 60 in the direction of the coil axis was 0.6 μm.

In Samples 1 to 4 of Example 2, the high-hardness insulating grains 44 contained in the inter-conductor layer 25 and inter-magnetic layer part 27 are harder than the metal magnetic grains 40, because they are aluminum oxide grains harder than the FeCrSi alloy magnetic grains.

As shown in Table 3, the inductance was 1.00 μH in Sample 1 of Comparative Example 1, but it was 1.07 μH in Sample 1, 1.10 μH in Sample 2, 1.29 μH in Sample 3, and 1.43 μH in Sample 4, of Example 2. This shows that the inductance increased in Example 2 from the level in Comparative Example 1.

Table 4 is a table showing the compositions, average grain sizes, and the like, of the grains contained in the magnetic layers 30, inter-conductor layers 25, 95, and inter-magnetic layer parts 27, 97, as well as the measured results of inductances, obtained in the fourth experiment.

TABLE 4

| | | Magnetic layer | | Inter-conductor layer, inter-magnetic layer part | | Grain | | |
|---|---|---|---|---|---|---|---|---|
| | | Composition (wt %) | Grain size (μm) | Composition (wt %) | Grain size (μm) | size ratio (%) | Conductor spacing (μm) | L-value (μH) |
| Comparative Example 1 | Sample 2 | 4.5Cr—3.5Si | 6 | 4.5Cr—3.5Si | 1 | 17 | 6 | 0.80 |
| Example 2 | Sample 5 | 4.5Cr—3.5Si | 6 | $Al_2O_3$ | 0.9 | 15 | 5.4 | 0.85 |
| | Sample 6 | 4.5Cr—3.5Si | 6 | $Al_2O_3$ | 0.4 | 7 | 2.4 | 0.89 |
| | Sample 7 | 4.5Cr—3.5Si | 6 | $Al_2O_3$ | 0.2 | 3 | 1.2 | 1.21 |
| | Sample 8 | 4.5Cr—3.5Si | 6 | $Al_2O_3$ | 0.1 | 2 | 0.6 | 1.25 |

As shown in Table 4, the fourth experiment used FeCrSi alloy magnetic grains of 6 μm in average grain size for the metal magnetic grains 40 contained in the magnetic layer 30, in all of Sample 2 of Comparative Example 1 and Samples 5 to 8 of Example 2, with the composition ratios of the respective elements adjusted to 92 percent by weight for Fe, 4.5 percent by weight for Cr, and 3.5 percent by weight for Si. Also, in Sample 2 of Comparative Example 1, FeCrSi alloy magnetic grains of the same composition as that of the metal magnetic grains 40 contained in the magnetic layer 30 were used for the metal magnetic grains contained in the inter-conductor layer 95 and inter-magnetic layer part 97, except that their average grain size was varied to 1 μm. The grain size ratio was 17%. The spacing of the conductor layers 60 in the direction of the coil axis was 6 μm.

Sample 5 in Example 2 used aluminum oxide grains of 0.9 μm in average grain size for the high-hardness insulating grains 44 contained in the inter-conductor layer 25 and inter-magnetic layer part 27. The grain size ratio was 15%. The spacing of the conductor layers 60 in the direction of the coil axis was 5.4 μm.

Sample 6 in Example 2 used aluminum oxide grains of 0.4 μm in average grain size for the high-hardness insulating grains 44 contained in the inter-conductor layer 25 and inter-magnetic layer part 27. The grain size ratio was 7%. The spacing of the conductor layers 60 in the direction of the coil axis was 2.4 μm.

Sample 7 in Example 2 used aluminum oxide grains of 0.2 μm in average grain size for the high-hardness insulating grains 44 contained in the inter-conductor layer 25 and inter-magnetic layer part 27. The grain size ratio was 3%. The spacing of the conductor layers 60 in the direction of the coil axis was 1.2 μm.

Sample 8 in Example 2 used aluminum oxide grains of 0.1 μm in average grain size for the high-hardness insulating grains 44 contained in the inter-conductor layer 25 and inter-magnetic layer part 27. The grain size ratio was 2%. The spacing of the conductor layers 60 in the direction of the coil axis was 0.6 μm.

In Samples 5 to 8 of Example 2, the high-hardness insulating grains 44 contained in the inter-conductor layer 25 and inter-magnetic layer part 27 are also harder than the metal magnetic grains 40 contained in the magnetic layer 30, just like in Samples 1 to 4 of Example 2.

As shown in Table 4, the inductance was 0.80 μH in Sample 2 of Comparative Example 1, but it was 0.85 μH in Sample 5, 0.89 μH in Sample 6, 1.21 μH in Sample 7, and 1.25 μH in Sample 8, of Example 2. This shows that the inductance increased in Example 2 from the level in Comparative Example 1.

The inductance increased in Example 2 from the level in Comparative Example 1, probably for the reason described below. Specifically, a smaller average grain size of the high-hardness insulating grains 44 narrows the spacing, which means that the spacing of the pair of conductor layers 60 adjacent to each other in the direction of the coil axis is narrower. This allows for increase in the winding density of the coil 50, which is likely why the inductance increased.

As shown in Example 2, the high-hardness insulating grains 44 contained in the inter-conductor layer 25 and inter-magnetic layer part 27 may be non-magnetic grains. In this case, too, the spacing of the pair of conductor layers 60 adjacent to each other in the direction of the coil axis can be narrowed because the high-hardness insulating grains 44 are harder and smaller in average grain size than the metal magnetic grains 40, and therefore the winding density of the coil 50 can be increased. This allows for increase in the inductance.

Also, when the high-hardness insulating grains 44 are non-magnetic grains, the insulating property of the inter-conductor layer 25 can be increased, which means that shorting between the conductor layers 60 can be prevented even if the average grain size of the high-hardness insulating grains 44 is decreased to make the inter-conductor layer 25 thinner. When the high-hardness insulating grains 44 are non-magnetic grains, the spacing of the conductor layers 60 (or specifically the thickness of the inter-conductor layer 25) is preferably no greater than one-fifth, or more preferably no greater than one-tenth, or yet more preferably no greater than one-twentieth, the conductor layer 60.

Figure 8:
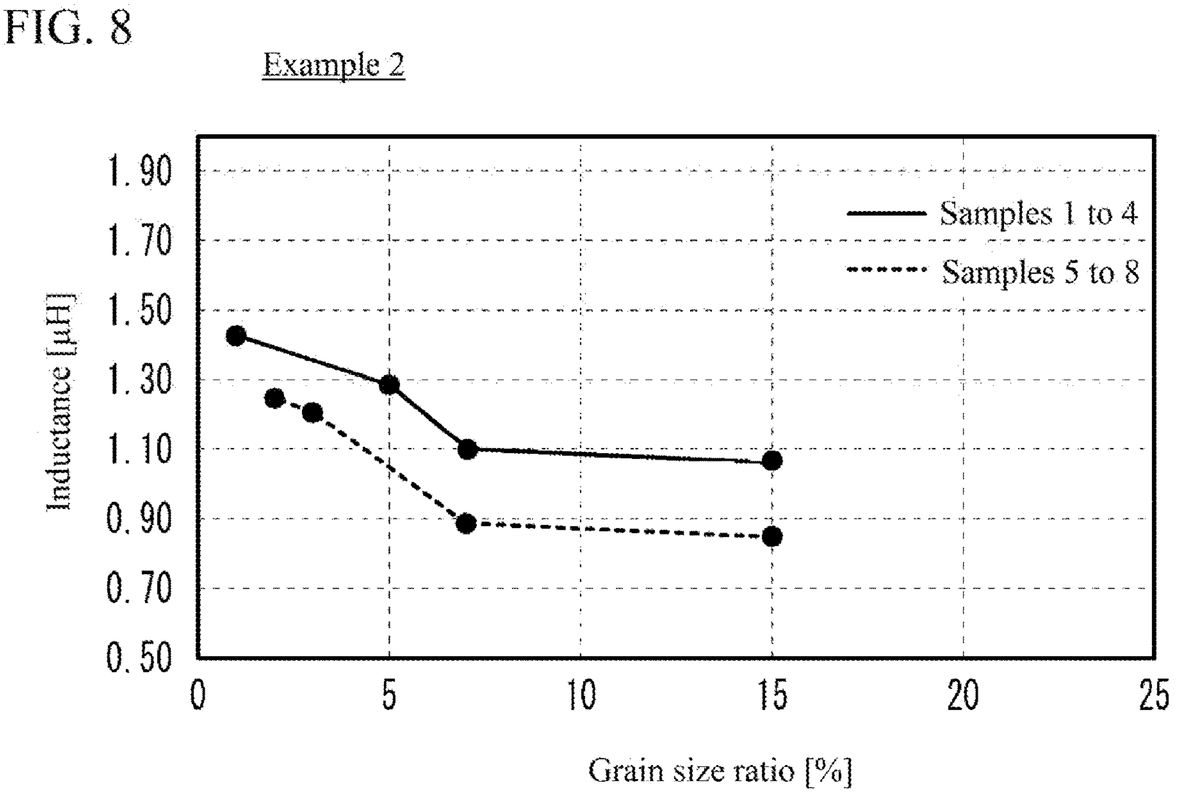
FIG. 8 is a diagram showing the correlations of grain size ratio and inductance relating to Samples 1 to 4 and Samples 5 to 8 in Example 2.

FIG. 8 is a diagram showing the correlations of grain size ratio and inductance relating to Samples 1 to 4 and Samples 5 to 8 in Example 2. In FIG. 8, the horizontal axis represents the grain size ratio, which is the percentage of the average grain size of the high-hardness insulating grains 44 to the average grain size of the metal magnetic grains 40. The vertical axis represents the inductance. As shown in FIG. 8, the smaller the grain size ratio, the higher the inductance becomes, even when the high-hardness insulating grains 44 are non-magnetic grains. This is probably because the smaller the grain size ratio, the thinner the inter-conductor layer 25 becomes and the narrower the spacing of the pair of conductor layers 60 adjacent to each other in the direction of the coil axis becomes, thereby allowing the winding density of the coil 50 to be increased.

This means that, even when the high-hardness insulating grains 44 are non-magnetic grains, the grain size ratio is preferably smaller from the viewpoint of increasing the inductance. Based on FIG. 8, the grain size ratio is preferably 7% or smaller, or more preferably 5% or smaller, or yet more preferably 3% or smaller, when the high-hardness insulating grains 44 are non-magnetic grains.

Example 3

Figure 9:
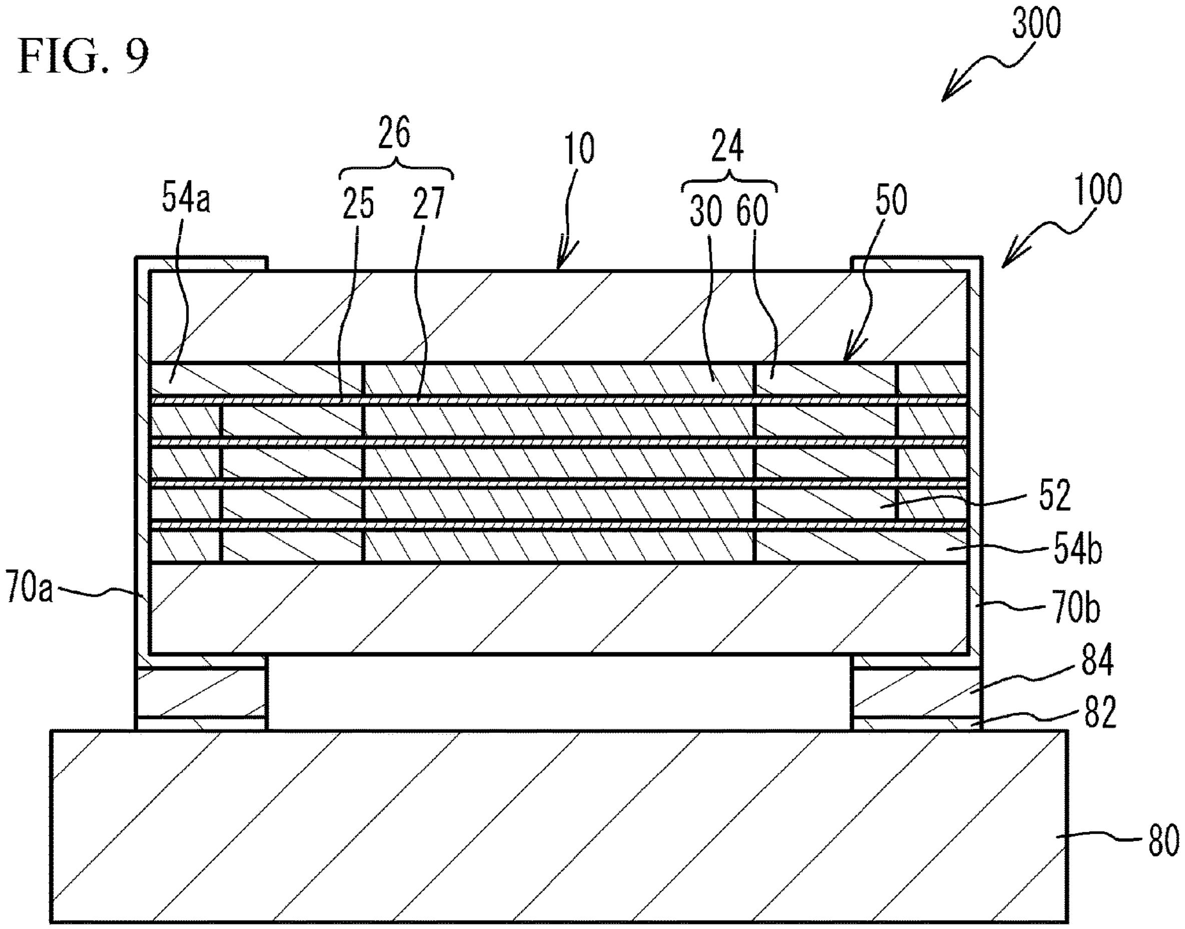
FIG. 9 is a cross-sectional view of the electronic device pertaining to Example 3.

FIG. 9 is a cross-sectional view of the electronic device pertaining to Example 3. As shown in FIG. 9, the electronic device 300 in Example 3 comprises a circuit board 80 and the multilayer coil component 100 in Example 1 that has been mounted on the circuit board 80. The multilayer coil component 100 is mounted on the circuit board 80 with its external electrodes 70*a*, 70*b* bonded to the electrodes 82 on the circuit board 80 by solder 84.

According to the electronic device 300 in Example 3, the multilayer coil component 100 in Example 1 is mounted on the circuit board 80. This way, the electronic device 300 having the multilayer coil component 100 of small size (lower height) and high inductance can be obtained. It should be noted that, while Example 3 illustrates an example where the multilayer coil component 100 in Example 1 is mounted on the circuit board 80, the multilayer coil component in Example 2 may be mounted thereon.

The foregoing described the examples of the present invention in detail; however, the present invention is not limited to these specific examples and various modifications and changes may be added to the extent that doing so does not deviate from the key points of the present invention described in "What Is Claimed Is."

We claim:

1. A multilayer coil component comprising:

a substrate body; and a coil embedded in the substrate body and containing a wound conductor;

wherein the substrate body has:

magnetic layers containing multiple metal magnetic grains, provided in a manner circumjacent to conductor layers in a direction roughly orthogonal to a coil axis of the coil, the conductor layers constituting the wound conductor; and multiple high-hardness insulating grains which have higher hardness than do the multiple metal magnetic grains and which are smaller in average grain size than that of the multiple metal magnetic grains, provided between the conductor layers adjacent to each other in a direction of the coil axis and also between the magnetic layers adjacent to each other in the direction of the coil axis, wherein the average grain size of the multiple high-hardness insulating grains is 0.1 μm or greater but smaller than 2 μm and is no greater than one-fifth the average grain size of the multiple metal magnetic grains.

2. The multilayer coil component according to claim 1, wherein a spacing between the conductor layers adjacent to each other is smaller than a thickness of the conductor layer.

3. The multilayer coil component according to claim 1, wherein the multiple high-hardness insulating grains are metal magnetic grains having same constituent elements as, but different composition ratios from, those of the multiple metal magnetic grains.

4. The multilayer coil component according to claim 3, wherein a ratio of an average grain size of the multiple high-hardness insulating grains to an average grain size of the multiple metal magnetic grains is 8% or smaller.

5. The multilayer coil component according to claim 1, wherein the multiple high-hardness insulating grains are magnetic grains having different constituent elements from those of the multiple metal magnetic grains.

6. The multilayer coil component according to claim 1, wherein the multiple high-hardness insulating grains are non-magnetic grains.

7. The multilayer coil component according to claim 6, wherein a ratio of an average grain size of the multiple high-hardness insulating grains to an average grain size of the multiple metal magnetic grains is 7% or smaller.

8. An electronic device comprising:

the multilayer coil component according to claim 1; and a circuit board on which the multilayer coil component has been mounted.

9. The multilayer coil component according to claim 1, wherein the average grain size of the multiple high-hardness insulating grains is 0.1 μm or greater but smaller than 1 μm.

* * * * *